Figure 1:
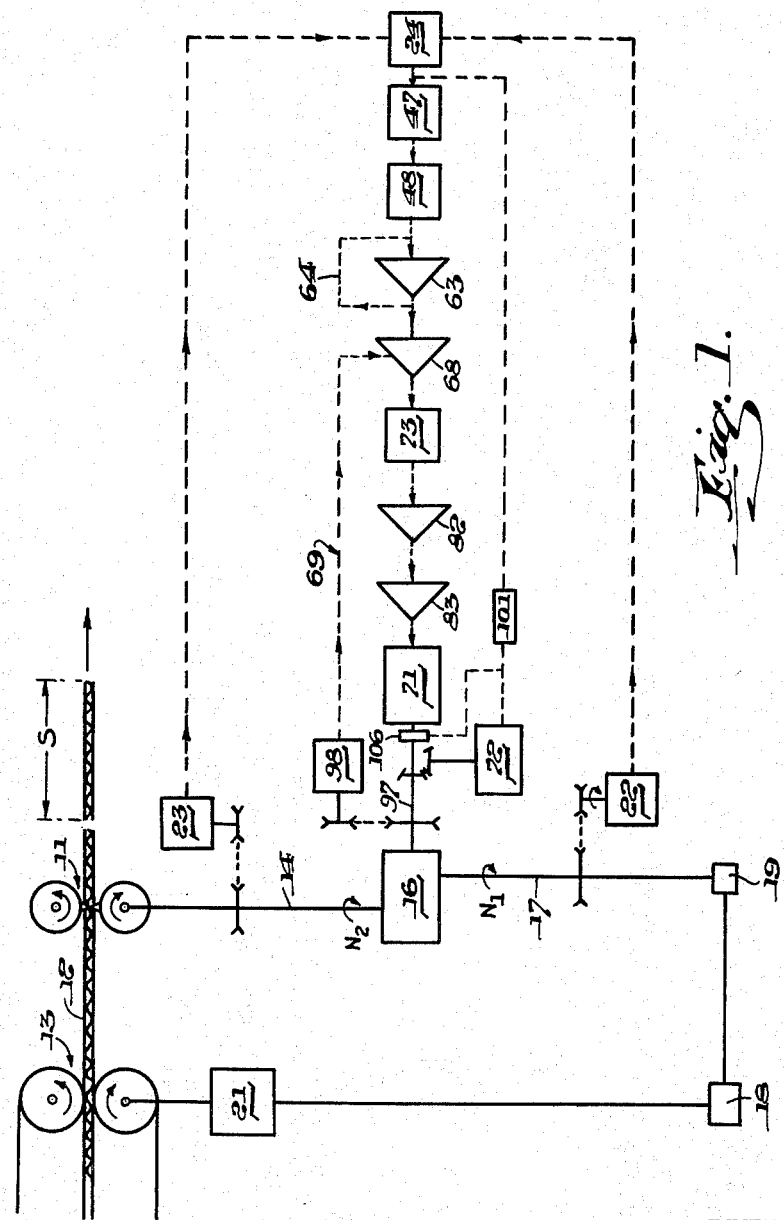

INVENTOR.
JOHN W. DRENNING.
BY Leo L. MaLossi
his ATTORNEY.

INVENTOR.
JOHN W. DRENNING.

March 30, 1965 J. W. DRENNING 3,175,440
FULLY AUTOMATIC SHEET-LENGTH CONTROL FOR A CUT-OFF
KNIFE WITH DIGITAL SELECTION AND DISPLAY
Filed Dec. 4, 1961 7 Sheets-Sheet 4

INVENTOR.
JOHN W. DRENNING.
BY
Leo J. MaLossi.
his ATTORNEY.

INVENTOR.
JOHN W. DRENNING
BY
Leo I. MacLossi
his ATTORNEY

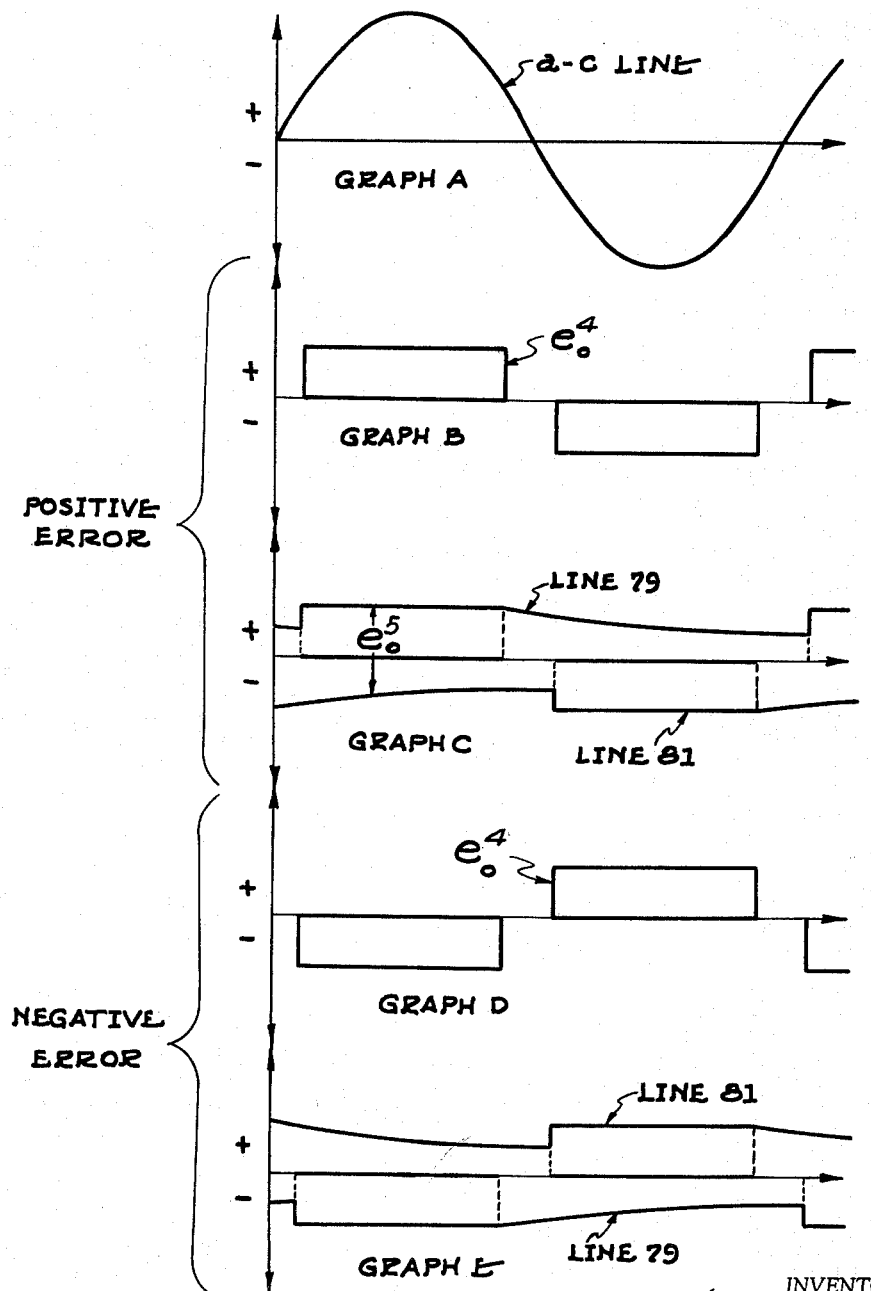

United States Patent Office 3,175,440
Patented Mar. 30, 1965

3,175,440
FULLY AUTOMATIC SHEET-LENGTH CONTROL FOR A CUT-OFF KNIFE WITH DIGITAL SELECTION AND DISPLAY
John W. Drenning, Baltimore, Md., assignor to Koppers Company, Inc., a corporation of Delaware
Filed Dec. 4, 1961, Ser. No. 156,682
5 Claims. (Cl. 83—76)

This invention is directed to an automatic control system for a cut-off mechanism for severing predetermined lengths from a continuous moving web and more particularly to an improved system for providing continuous, fully automatic correction of errors which produce any discrepancy between a digitally selected length of sheet and the length of sheet actually cut by the mechanism.

Devices presently employed in the industry must tolerate a certain degree of error in the length of the sheet cut before corrective measures can be initiated. Also, when the corrective measures have been initiated, the present control devices lack the sophistication necessary to prevent overcompensation for the error.

The production line in many industrial operations, such as in the manufacture of cardboard box blanks, extends over long distances. For many years the need has been felt for the provision of digital indications at a series of remote stations along the production line to display to the operators the length of the sheet selected for the order currently in production.

However, in spite of the increasing tendency in the paperboard industry today of running more and more small orders of different sheet lengths such an improved control system with its attendant increased efficiency and speed has failed to materialize prior to the advent of the present invention.

It is therefore an object of the present invention to provide control means for a cutting mechanism providing digital selection of sheet length to be cut without stopping the cut-off mechanism.

A second object of the present invention is the provision of digital display of the sheet length selected to be cut, which display may be made available both adjacent the cut-off mechanism and at positions remote therefrom.

An additional object of the present invention is the provision of fully automatic, substantially continuous correction of sheet length to correspond to the digital selector setting without overcompensation by the corrective device.

Still a further object of the present invention is the provision in an electronic cut-off knife control system of means for eliminating distortions in the error signal sensed due to tachometer commutator noise, shaft and pulley run-out, torque variations and similar vibratory disturbances.

Yet an additional object of the present invention is the provision of means for automatically initiating high speed (coarse) adjustment of sheet length for large order changes or very large error accumulations and simultaneously disabling the slow speed (fine) adjustment and, when the speed of the cutting knife has been adjusted to within a substantial degree of 100% correction, automatically disabling the high speed adjustment and simultaneously returning the system to slow speed adjustment.

In providing for the above-mentioned objects the present invention embodies an electronic control system for providing completely automatic monitoring of the operation of a cut-off mechanism by detecting deviations between the sheet length actually cut and the digitally selected sheet length, transforming these deviations into pure error signals free of irrelevant disturbing distortions, transforming these error signals into general indications of magnitude and accurate direction of error, biasing the strength of the signal to prevent overcompensation of the error and enabling the resultant signal to actuate a correction device thereby changing the speed of the cut-off mechanism.

Figure 2:
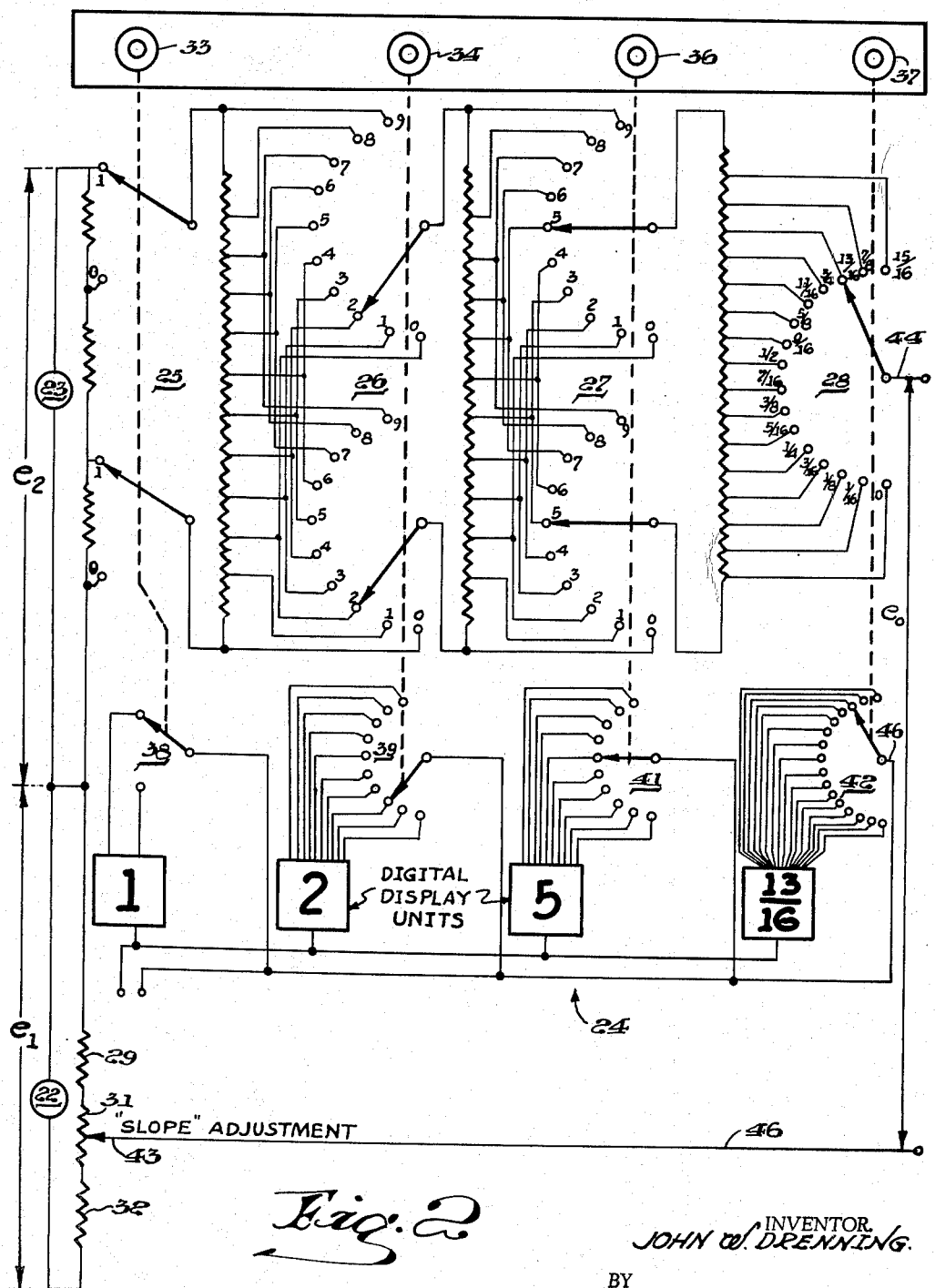
Figure 10:
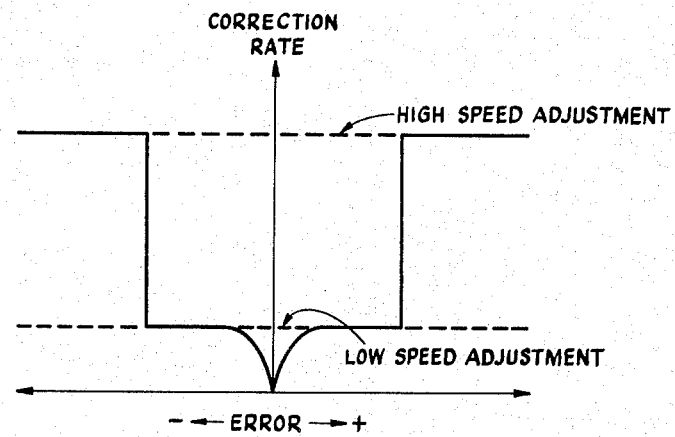
Figure 3:
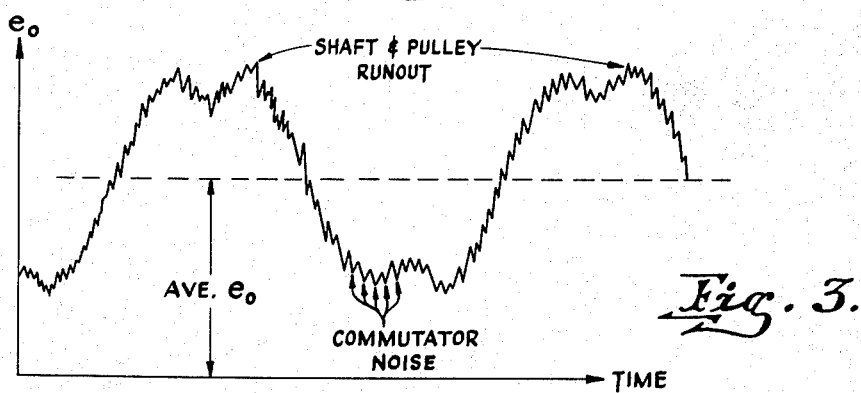
Figure 6:
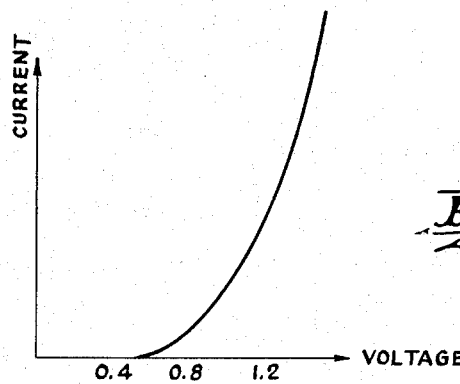
Figure 4:
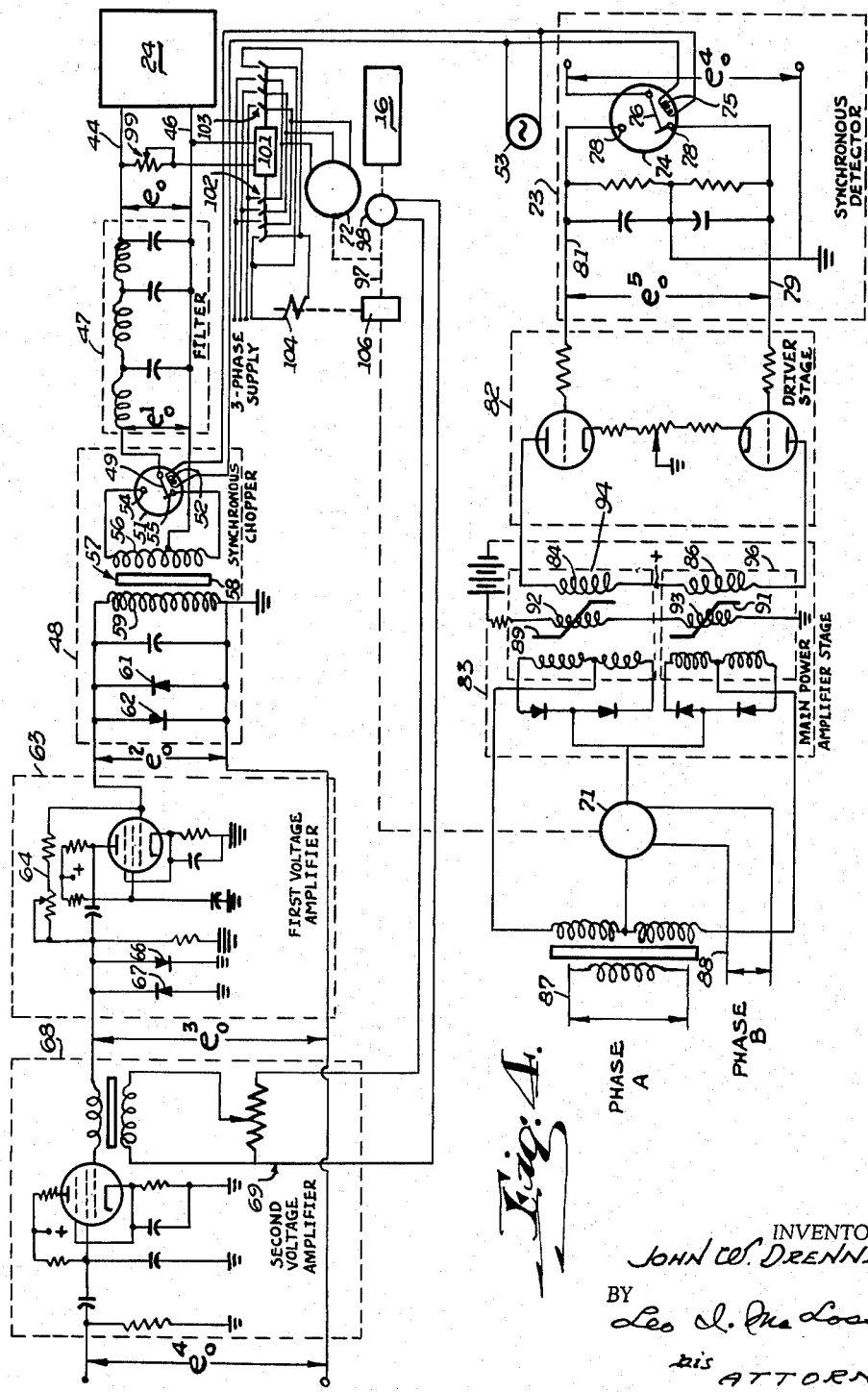
Figure 5:
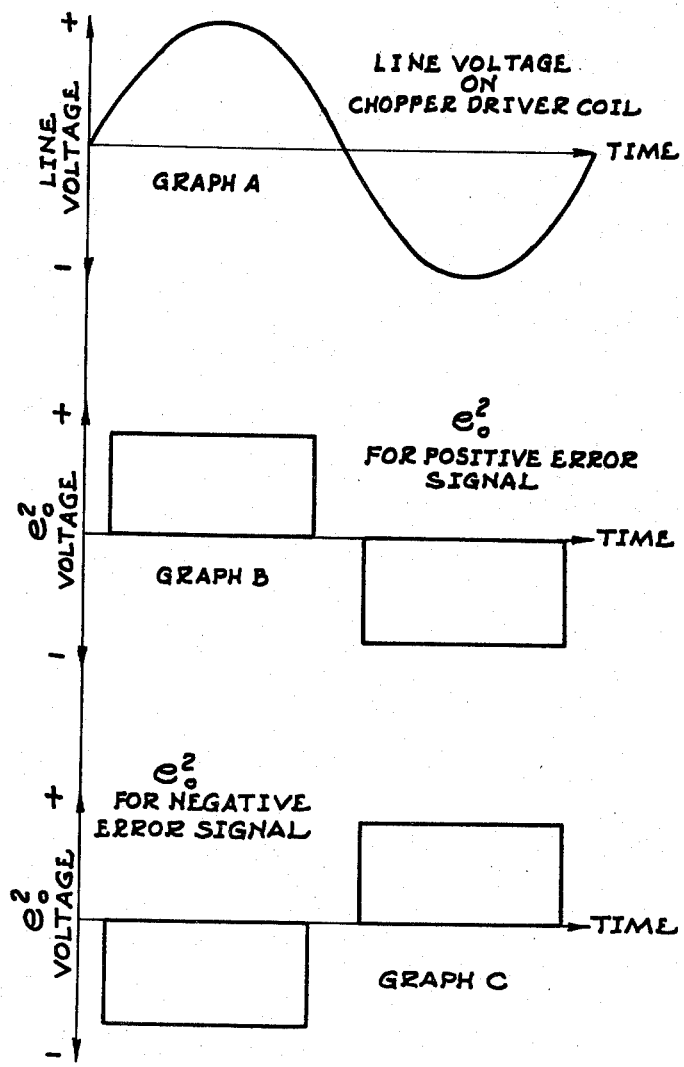
Figure 8:
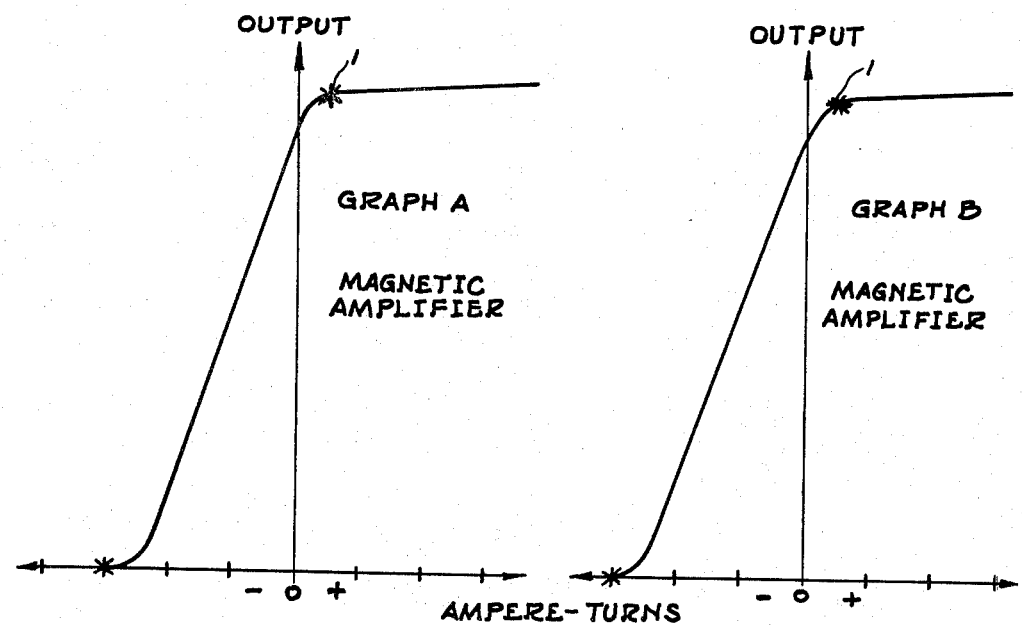
Figure 9:
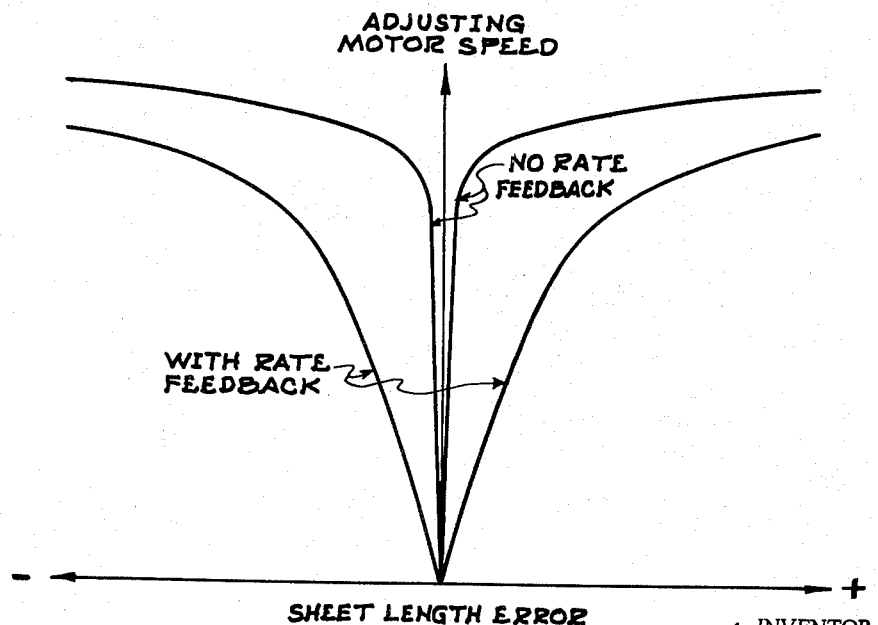

Other objects and advantages of the invention will hereinafter become more fully apparent from the following description of the annexed drawings, which illustrate a preferred embodiment, and wherein:

FIGURE 1 is a block diagram showing mechanical and electrical connections for the preferred embodiment of the entire control system, FIGURE 2 shows a schematic representation of the means for digital selection and display of sheet length and the mechanism for detecting deviations from the digitally selected sheet length, FIGURE 3 is a graphic representation of a typical error signal as detected by the sheet selector with an indication of the distortion thereof due to certain vibratory disturbances, FIGURE 4 is a diagram of the details of the electronic control system other than the sheet selector, FIGURE 5 provides a graphic representation of the alternating error signals produced by the synchronous chopper, FIGURE 6 graphically displays performance characteristics of a silicon diode, FIGURE 7 is a graphic representation showing the effects of the synchronous detector circuit on the amplified alternating error signal, FIGURE 8 graphically illustrates output characteristics of the magnetic power amplifiers as a function of ampere-turns, FIGURE 9 provides a graphic illustration of the effect on the speed of correction by the adjusting motor by the use of rate feedback and FIGURE 10 is a graph showing the change in correction rate as a function of the size of the deviation in the cutting operation.

Referring now to the block diagram shown in FIGURE 1, S represents the length of sheet material being cut by the cutting mechanism. This length S is determined by the speed of cutting knife 11 relative to the rate of feed of moving web 12 by feed rolls 13.

Since the speed of cutting knife 11 is determined by the speed $N_2$ of the output shaft 14 of variable speed transmission 16 and since the rate of web feed is ordinarily represented by the speed $N_1$ of input shaft 17 which provides the drive for the variable speed transmission 16 via gearing mechanisms 18 and 19 from main drive 21, the relationship between speeds $N_1$ and $N_2$ will accurately represent length S. For this purpose tachometer 22 mechanically connected to shaft 17 and tachometer 23 mechanically connected to shaft 14 are employed.

In the event that feed rolls 13 cannot be relied upon to supply the moving web 12 to knife 11 at a rate proportional to the speed $N_1$ of input shaft 17, the rate of feed tachometer may, as an alternative arrangement not shown, be driven from the surface of moving web 12.

Tachometers suitable for the purpose of measuring shaft speed are commercially available and are characterized by their ability to produce a unidirectional voltage directly proportional to their speed of rotation by the shafts to which they are connected. For purposes of illustration the voltage generated by tachometer 22 is indicated as $e_1$ and the voltage generated by tachometer 23 is represented by $e_2$.

Thus, in order to quantitatively determine sheet length S, it becomes necessary to compare voltages $e_1$ and $e_2$. The electrical circuity employed for accomplishing this comparison is shown in FIGURE 2 and comprises the digital sheet selector device 24. Voltage $e_2$ is supplied across the resistances shown connected to a series of switches 25, 26, 27 and 28 and voltage $e_1$ is applied across resistances 29, 31 and 32 or portions thereof as will be explained in greater detail below.

Each combination of settings for switches 25, 26, 27 and 28 provides one unique ratio of voltages $e_1$ and $e_2$ for which the output voltage $e_0$ will be zero. It follows, therefore, that there is also a unique sheet length S for each combination of switch settings which will make $e_0$ equal to zero.

The resistors connected to the several switches are so chosen that switch 25 selects sheet lengths in units of hundreds of inches, switch 26 selects sheet lengths in units of tens of inches, switch 27 selects sheet lengths in units of inches and switch 28 selects sheet lengths in fractions of or in decimal inches.

For example, therefore, to set digital sheet selector device 24 to produce a sheet length of $125^{13}\!/_{16}$ inches, switch 25 is set on its position 1, switch 26 is set on its position 2, switch 27 is set on its position 5 and switch 28 is set on its position corresponding to $^{13}\!/_{16}$ inches.

If it should be desired to set a quantity on digital sheet selector 24 reading in sixty-fourths of an inch or smaller, the use of a switch for such small quantities is presently commercially impractical and switch 28 would be replaced by a potentiometer. For those applications in which fractional selections greater in quantity than sixty-fourths of an inch are required, switches are available and are preferable to potentiometers due to their more desirable operating features.

The switches 25, 26, 27 and 28 are set by rotating selector knobs 33, 34, 36 and 37 respectively. Simultaneously with the setting of switches 25, 26, 27 and 28 is the setting of a second deck of switch contacts 38, 39, 41 and 42. Proper display lights are energized by switch contacts 38, 39, 41 and 42 to provide accurate visual indication of the digital selection of sheet length actually made. Such display is made at sheet selector 24 and also at those remote stations where such display is required. Exemplary digital display units are shown connected to switches 38, 39, 41 and 42.

An alternative simpler arrangement (not shown) for visual indication of the digital selection impressed on the sheet selector 24 is one in which a small opening is provided above each of selector knobs 33, 34, 36 and 37. Upon rotation of any given selector knob a number corresponding to that portion of the sheet length selected will be brought into registry with the corresponding opening.

A mathematical representation of the relationship between those factors, the measurement of which will indicate sheet length S, is set forth as follows:

$$S = C \frac{K_2}{K_1} \frac{e_1}{e_2}$$

However, it is apparent that the sheet length being cut is measurable by means of the voltages $e_1$ and $e_2$ generated by tachometers 22 and 23, only if quantities $K_1$ and $K_2$ remain truly constant in value. These quantities $K_1$ and $K_2$ are measured in terms of the voltage per r.p.m. produced by tachometers 22 and 23.

Since no two tachometers are ever exactly the same in operation and voltage output, means must be provided to insure that the ratio of quantities $K_1$ and $K_2$ remains constant. For this purpose, slope adjustment 43 is provided to permit adjustment for small variations between tachometers 22 and 23. This slope adjustment need be made only once the time that the control apparatus is zeroed in or once whenever a tachometer is replaced.

Should sheet length S be shorter than the sheet length digitally selected and displayed, this condition indicates that speed $N_2$ of shaft 14 is too high and is causing cut-off knife 11 to run too fast. When this condition occurs, tachometer 23 is being driven at a proportionately greater speed and produces a higher voltage $e_2$. In the sheet selector 24 where voltage $e_2$ is compared with voltage $e_1$, the resultant voltage $e_0$ will then have some value other than zero and line 44 will have a positive potential with respect to line 46.

When tachometer voltage $e_2$ is too low, such as when the cutting mechanism severs sheets longer than the standard selected and displayed on the digital display units, the output from sheet selector 24 is such that line 46 has a positive potential with respect to line 44. In this manner the apparatus is able to detect the direction of the error and the magnitude of the signal $e_0$ is proportional to the magnitude of the sheet length error.

Although output voltage $e_0$ may be used to automatically correct for errors because of its sensitivity both to direction (polarity) and magnitude, this signal voltage must first be modified both in respect of its power and its voltage to render it useful for this purpose.

Because the error signal actually encountered in practice is not a perfectly smooth unidirectional signal, this error signal $e_0$ is passed through filter 47. Several extraneous vibrational components caused during the operation of mechanical portions of the system such as shaft and pulley eccentricity, tachometer commutator interference and torque variations in the drive system impose distortions upon the basic error signal.

FIGURE 3 graphically displays a typical error signal voltage $e_0$. This is a distorted alternating current signal and the only component thereof which is of value for control purposes is the average D.-C. portion shown by the dotted line. Any other portion of this signal, if allowed to pass in to the control circuity will cause difficulties. Passing this error signal through filter 47 serves to limit the portions of the signal which may pass through to the control circuity. Since filter 47 has a low-pass characteristic permitting only the signals having a frequency from 0.0 c.p.s. to about 15 c.p.s. to pass, most of the abovementioned objectionable distorting signals are eliminated. The circuity for filter 47 is shown schematically in FIGURE 4.

The output signal from filter 47 is a modified unidirectional error signal $e_0{}^1$ which is then converted to an alternating, phase-sensitive signal in transformer-coupled synchronous chopper 48. Movable contact 49 in the chopper 51 is driven magnetically from coil 52 which is electrically energized from an alternating voltage source 53 having a frequency of 60 c.p.s. Stationary contacts 54 and 55 are alternately closed once during each cycle of voltage applied to the vibrator coil 52.

Such choppers are commercially available and are generally suitable for use in this control equipment providing that the generation of noise within the chopper is maintained extremely low so as not to mask out the error signal.

By alternately connecting the D.-C. error signal $e_0{}^1$ to the two halves of the primary winding 56 of the transformer 57, an alternating flux is set up in the core 58 which in turn induces an alternating voltage in the secondary winding 59. Typical A.-C. signals for positive and negative D.-C. error signals are shown as graphs B and C of FIGURE 5 while graph A shows the line voltage impressed on the chopper driver coil 52.

The particular arrangement of graphs shows the relationship which the positive (or negative) error signal $e_0{}^2$ has to the line voltage on chopper coil 52. As shown, for positive error signal $e_0{}^1$ an alternating error signal $e_0{}^2$ is produced assuming a fixed phase relationship with the line frequency. In the case of a negative error signal $e_0{}^1$, the alternating error signal $e_0{}^2$ which is produced assumes a fixed relationship shifted 180° from that of the positive error signal. In this manner, it may be seen that the phase position of the A.-C. error signal $e_0{}^2$ indicates the direction of the error while the amplitude thereof indicates the magnitude of the error.

During operation of the cut-off mechanism and the control system, as long as any error in the sheet length is small in magnitude, D.-C. error signal $e_0^1$ is also small, e.g. in the order of from 1 to 10 millivolts. Under these conditions there is, of course, no danger of damage to the chopper contacts 54, 55 or to other components.

However, in the event selector knobs 33, 34, 36 and 37 are reset to initiate any sizable change in the sheet length to be cut, the error signal can reach values as great as 1,000 millivolts, since during this change in the digital selection of sheet length, the sheet length error and the error signal have large values. To prevent damage to the sensitive chopper contacts 54, 55 as well as to other components of synchronous chopper 48, two semi-conductor diodes 61 and 62 are provided.

These semi-conductor diodes 61 and 62 are characterized by their non-linear resistance to current flow as is graphically represented in FIGURE 6. Although the resistance of these devices is quite large for small voltages, the resistance becomes increasingly lower for large voltages whereby the voltage across the diodes 61 and 62 as well as the voltage on the chopper contacts can never exceed a value of approximately 1.5 volts.

The output signal $e_0^2$ which is an alternating, phase-sensitive error signal next passes to a first voltage amplifier 63. Amplifier 63 is basically a conventional capacitance-coupled A.-C. amplifier modified slightly with variable resistance, negative feedback loop 64 employed for stability and sensitivity control. The tube employed in amplifier 63 is a special low-noise version of the 6J7 pentode designated as type 1620. By means of the adjustable feedback loop 64 the voltage gain in this stage may be varied from approximately 50 to as much as 200.

A relatively large voltage gain in the first stage of amplification can create an overload condition in the circuitry similar to that encountered in connection with the input to synchronous chopper 48 during a major change in digital sheet length selection. Since such an overload condition would tend to saturate the next amplifier stage, this condition is prevented by employing the same protective mechanism used in the synchronous chopper 48. Thus the protective circuit employs semi-conductor diodes 66 and 67 which effectively limit the output voltage $e_0^3$ during overload conditions but become relatively ineffective for signals of small magnitude.

The amplified, phase-sensitive, alternating signal $e_0^3$ is next applied to the second stage of amplification in voltage amplifier 68. The circuitry for this stage of amplification is identical to that of voltage amplifier 63 save that the error signal feedback loop 64 is omitted and in its place a correction-rate feedback connection 69 is inserted. The operation of the correction-rate feedback connection 69 will be discussed in greater detail below in conjunction with a discussion of the operation of adjusting motors 71 and 72.

Output signal $e_0^4$ from second voltage amplifier 68, though somewhat modified by the voltage input from the above-mentioned correction-rate feedback loop 69, is similar to the output signal $e_0^3$ from the first stage of amplification.

These two stages of amplification are sufficient to boost the error signal to a useful value. Since error signal $e_0^4$ exists as a phase-sensitive, alternating voltage, means must now be provided to detect the direction (or polarity) and the magnitude of error signal $e_0^4$. This function is accomplished by the use of synchronous detector 73 which converts alternating signal $e_0^4$ to a unidirectional signal $e_0^5$, which is a reproduction of the original error signal $e_0^1$ except that it is much larger in magnitude.

In the circuitry of synchronous detector 73, chopper 74 is employed operating with moving contact 76 exactly in step with moving contact 49 of chopper 51 in synchronous chopper 48. To insure exact synchronism between choppers 51 and choppers 74, the circuit components and wiring can be so adjusted that both moving contacts 49 and 76 can be housed in the same enclosure wherein a single driver coil such as coil 52 is employed to simultaneously move both moving contacts 49 and 76. In this manner moving contact 76 engages stationary contact 77 at the same time that moving contact 49 engages stationary contact 55. Likewise, when moving contact 76 engages stationary contact 78, moving contact 49 will engage stationary contact 54.

In the present arrangement for simplicity of illustration a separate driver coil is shown for each of choppers 51 and 74, coil 52 being indicated for chopper 51 and coil 75 for chopper 74.

As a result, when incoming signal $e_0^4$ is positive with respect to ground and the moving contact 76 is in the position shown, current will flow in the circuit so that line 79 on the output side of synchronous detector 73 is also positive. During the negative half cycle of incoming error signal $e_0^4$ the moving contact 76 engages stationary contact 78 and current flows to make line 81 negative with respect to ground.

When the polarity of incoming error signal $e_0^4$ is opposite to that in the preceding situation, i.e. the signal is negative during the first half cycle when moving contact 76 is in the position shown in FIGURE 4, the output signal $e_0^5$ has its polarity reversed. In this case line 79 is negative with respect to ground and line 81 is positive with respect to ground.

FIGURE 7 graphically presents the transition from $e_0^4$ to $e_0^5$ in the synchronous detector 73 for both cases with the graphs D and E representing the alteration which occurs in the case of a negative error signal and with graphs B and C representing the transition in the case in which the error signal is positive.

Output voltage $e_0^5$ from synchronous detector 73 has, at this point, sufficient voltage magnitude but lacks the necessary power capacity to operate a correction device such as a servo motor. To rectify this situation signal $e_0^5$ must be submitted to two stages of power amplification in driver stage amplifier 82 and in main power amplifier 83. The circuitry for the driver stage is a cathode follower circuit to provide a large current gain but with modification thereto to take the signal out in the plate circuit instead of from the cathode resistor. This modification is necessary since the circuitry for the next stage of amplification includes magnetic amplifiers, which amplifiers if introduced into the cathode circuit would impose the harmonics which exist in the control windings 84, 86 into this circuit and have a detrimental effect.

When line 81 is positive with respect to ground, line 79 is negative with respect to ground. With such a condition existing, the current flowing in winding 84 will increase and the current flowing in winding 86 will decrease. As a result the input windings 84, 86 for the next stage of amplification receive an unbalanced current input thereto.

In the case in which line 81 is negative with respect to ground while line 79 is positive with respect to ground there will be a current input to the main power amplification stage 83 which is unbalanced in the opposite direction, i.e. the current in winding 84 will be less than the current in winding 86.

At times during which no error exists, lines 81 and 79 are both at zero potential, the output currents are balanced and the current in winding 84 is equal to the current in winding 86.

For the second stage of power amplification conventional magnetic amplifier 83 is employed which by amplifying the signal supplies a variable phase-reversible output voltage to actuate slow adjusting motor 71, a two-phase servo motor. Power for the two-phase servo motor is shown diagrammatically as being provided at 87 and 88.

When the error signal is zero, the currents flowing in windings 84 and 86 are equal as stated above and produce positive ampere turns in cores 89 and 91 as indicated points 1 on the typical performance curves shown in graphs A and B of FIGURE 8. This number of ampere-turns would normally produce full output voltage from both amplifiers.

However, when the error signal is zero there should be no output from either amplifier and to produce this condition a second set of control windings, windings 92 and 93 are provided in addition to the first set of control windings 84 and 86. A bias current is supplied to windings 92 and 93 adjusted to produce sufficient negative ampere-turns in each of cores 89 and 91 to more than offset the positive ampere-turns produced by the first control windings 84 and 86. As a result cores 89 and 91 have sufficient negative ampere-turns produced therein to reduce the output of each of amplifiers 94 and 96 to zero.

For those error signals resulting in current flowing in control winding 84 greater than the current flowing in control winding 86 the net ampere-turns in core 89 has a greater positive value and amplifier 94 will produce a voltage which will be applied to actuate slow adjusting motor 71 causing it to rotate in a given direction. Since the net ampere-turns in core 91 becomes more negative, the output from amplifier 96 remains at zero.

For those situations in which the error signals cause the current in control winding 84 to be less than the current in control winding 86, the opposite effect is produced and amplifier 96 now produces the voltage to rotate slow adjusting motor 71 while amplifier 94 has a zero output. In this situation slow adjusting motor 71 will rotate in a direction opposite to that direction of rotation produced when the driving voltage comes from amplifier 94, since the applied voltage from amplifiers 94 and 96 are 180° out of phase.

Thus, with the arrangement described above when a positive error occurs, slow adjusting motor 71 can be made to rotate in a desired direction and when a negative error is encountered the rotation thereof will be in the opposite direction.

The speed of rotation in either direction is proportional to the amount of current which is applied to the magnetic amplifier control windings 84 and 86, which current in turn is also proportional to the magnitude of the discrepancy between the digitally selected sheet length and the actual length S of sheet cut.

As is shown in FIGURE 1 the slow, or fine adjustment motor 71 is connected to the control screw (not shown) of the variable speed transmission 16 by way of shaft 97. Thus, as shaft 97 is rotated, the sheet length S severed by cut-off knife 11 is made to increase or decrease to correspond to the digitally selected sheet length on display. By properly phasing adjusting motors 71 and 72, a transmission correction to increase the length of sheet severed can be made in response to negative errors, i.e. when the length of sheet being severed is shorter than the digital sheet length selected, and to decrease the length of sheet severed in response to positive errors thereby making the system self correcting.

In order to stabilize the control system and prevent overcorrection by the adjusting mechanism, tachometer 98 connected to shaft 97 is employed to produce an alternating, phase-sensitive voltage signal having its magnitude proportional to the rate at which correction is being effected by the servo motor and with its phase relationship determined by the direction in which correction is being effected by the servo motor.

This stabilizing system is designated in FIGURE 4 as the rate feedback loop 69 adapted to impress a voltage upon the error signal in second voltage amplifier 68. The rate signal from tachometer 98 is adjusted so that it is exactly 180° out of phase with the error signal forming the input to voltage amplifier 68. Therefore, when the error signal is small in magnitude, shaft 97 will be rotated slowly by slow adjusting motor 71 and shaft 97 will, in turn, rotate rate tachometer 98 slowly. This effect is illustrated graphically in FIGURE 9 wherein the upper pair of curves shows that without rate feedback the speed of adjusting motor 71 would be too great in the case of small sheet length errors and would overcorrect for the error. The lower pair of curves in FIGURE 9 shows that with rate feedback the adjusting motor speed is properly correlated to move much slower than in the case of no rate-feedback as the slower sheet length errors are reduced to smaller and smaller magnitudes whereby the latter portion of the corrective motor operation is at a speed more gradually approaching zero error and overcorrection is thereby avoided.

The correction system as it has been described up to this point produces very satisfactory automatic adjustment for small sheet length errors up to approximately ±5 inches. In the case of larger errors, however, although these errors can be corrected, the time required for effecting the correction can be prohibitive due to the relatively slow rate of correction inherent in the system. As an example, using a typical link belt variable speed transmission as the unit 16 there would be approximately 22 turns required of control shaft 97 in order to adjust variable speed transmission 16 throughout its entire range of available speed ratios. The time required to effectuate these 22 turns would be approximately four minutes, a time period which is much too long.

To overcome this slight inadequacy, a high speed adjustment mechanism has been incorporated into this control system. The overall correction-rate characteristics achieved with this novel control system are shown in FIGURE 10. The circuity for incorporating the high speed adjusting mechanism is shown schematically in FIGURE 4.

As has been mentioned above, $e_0$, the signal coming from sheet selector 24 is indicative both of the direction of the sheet length error and the magnitude thereof. In the case of very large errors (or in the case of major changes in the digital selection of sheet length to be cut) the signal $e_0$ continues to increase with the increasing error even after slow speed adjusting motor 71 has reached its maximum correction speed, which speed is designed to compensate only for very small errors. Therefore, by properly adjusting variable resistor 99 located in FIGURE 4 between sheet selector 24 and filter 47, polarity-sensitive relay 101 can be adjusted to close whenever a sheet length error occurs which is greater in magnitude than that required to operate slow adjusting motor 71 at its maximum speed. Moreover, the direction of the error will cause the closing of either switch 102 or switch 103. Should either switch 102 or switch 103 be closed, coil 104 becomes energized and disengages electric clutch 106 which in turn disconnects slow adjusting motor 71 from shaft 97.

When switch 102 is the switch which is closed, high speed fast adjusting motor 72 will be put into operation simultaneously with the disconnecting of slow adjusting motor 71. Since fast adjusting motor 72 rotates at a much faster speed than motor 71, control shaft 97 will be rotated at a higher speed and the error will be reduced in magnitude at a greater rate than it would be reduced by motor 71. When the error has been reduced to the point at which the error signal voltage $e_0$ has been reduced below the drop-out voltage for relay 101, the relay is de-energized, fast adjustment motor 72 ceases to operate, clutch 106 is re-engaged and slow adjusting motor 71 again becomes operative to continue to reduce the error signal $e_0$ until the error has been eliminated. In this manner slow adjustment motor 71 will always be ready to correct for small errors.

In the event that switch 103 should be the one to close, fast adjusting motor 72 immediately begins to operate in place of motor 71 to minimize the error, which in this case is in the opposite direction. The operating sequence beyond this point is the same as that sequence described above in connection with the closing of switch 102.

Therefore, in the operation of this novel control mechanism for a cut-off knife, once the sheet length has been digitally selected with the digital selector device and impressed upon its accompanying digital display units, any subsequent small deviation between the selected sheet length and the length S actually severed will result in the production of an error signal voltage $e_0$ in sheet selector 24.

This error signal will be too small to actuate relay 101 and will simply proceed through the electronic circuity for modification by filter 47, synchronous chopper 48, voltage amplifiers 63 and 68, synchronous detector 73, driver stage 82 and main power stage 83. The ultimate signal will actuate slow speed adjusting motor 71 for rotation in the proper direction to compensate for the small error being corrected and at a speed determined in part by the rate of response of slow adjusting motor 71. As is illustrated in FIGURE 9, as the error in sheet length is reduced the speed of motor 71 is greatly reduced in comparison to its speed for the same residual error without rate feedback and the deviation in sheet length S from the digitally selected length is reduced to zero in a fully automatic manner. This corrective measure is executed without overcorrection, without the distracting ghost voltages due to tachometer commutator noise, shaft and pulley runout and torque variations in the drive system yet with a continuously responsive facility to detect, program and reduce simultaneous, sequential and/or intermittent error signals of any direction or magnitude.

The sequence of operation in the case of a very large error in the sheet length S or resetting of the digital selector 24 for a new run on the production line differs from the previously described operation in that the signal will have sufficient magnitude whereby once the slow adjusting motor 71 is operating at its maximum speed, the error signal voltage $e_0$ will continue to increase until a voltage greater in value than the pull-in voltage of relay 101 is impressed across variable resistor 99. Activation of relay 101 will cause either switch 102 or 103 to be actuated. Simultaneously therewith coil 104 will be actuated thereby disengaging clutch 106, disconnecting slow speed adjusting motor 71 from control shaft 97 and in its stead connecting fast adjusting motor 72 to rotate control shaft 97 at high speed in the proper direction to reduce the error.

When the error signal has been reduced to a small value such that the voltage impressed across variable resistor 99 has a value less than the drop-out value of relay 101, fast adjusting motor 72 will be disconnected, clutch 106 will re-engage and slow adjusting motor 71 will take over the task of compensating for the residual small error executing this function without overcompensating therefor.

While the control system is engaged in correcting for any given error signal, any additional errors experienced before correction has been completed will simply impress their individual effects upon the control system and increase or decrease $e_0$ depending upon the direction of the error relative to the error which has already detected and which is responsible for the initiation of the correction operation.

It should be understood, of course, that the foregoing disclosure relates only to a preferred embodiment of this invention and that numerous modifications or alterations may be made therein without departing from the spirit and the scope of the invention as set forth in the appended claims.

What is claimed is:

1. A device for exercising a control function over a cut-off mechanism, comprising rotatable severing means for severing a moving web, means for feeding and moving said web to said severing means, first means for generating a signal proportional to the speed of said moving web, second means for generating a signal proportional to the rotational speed of said severing means, means for selecting a desired digitally-expressed sheet length to be severed, an electrical equivalent of the digital selector means connected thereto, means connected to said electrical equivalent for comparing the ratio of the signals from said first and second generating means therewith with an error signal voltage output therefrom whenever the length of the sheet severed differs from said digitally-expressed sheet length, means connected to said comparing means for extracting from the output error signal voltage of said comparing means the average D.-C. signal portion thereof, means connected to said extracting means for converting the average D.-C. signal received therefrom to an alternating, phase-sensitive signal, means connected to said converting means for amplifying the output signal therefrom, means connected to said amplifying means for detecting the directional and magnitude characteristics of the amplified error signal, means connected to said detecting means and responsive to the output signal therefrom for changing the rotational speed of said severing means relative to the speed of said means for feeding said web to reduce the error signal voltage to zero, third means connected to said speed changing means for generating a signal proportional to the rate of speed change of said speed changing means and means interconnecting said third generating means and said amplifying means for impressing the signal from said third generating means upon said amplifying means to bias the error signal being amplified therein whereby said speed changing means automatically reduces to zero any error detected without overcorrection.

2. A device for exercising a control function over a cut-off mechanism, comprising rotatable severing means for severing a moving web, means for feeding said moving web to said severing means, first means for generating a signal proportional to the speed of said moving web, second means for generating a signal proportional to the rotational speed of said severing means, means for digitally selecting a standard sheet length to be severed, said standard sheet length being expressed in hundreds of units, tens of units, units and subdivisions of units, means connected to the digital selecting means for representing the electrical equivalent of the digitally-expressed sheet length, means connecting said first and second generating means to said representing means for applying thereto signals generated thereby, an output error signal voltage from said representing means resulting whenever the length of sheet severed differs from the standard sheet length, means connected to said representing means for extracting from the error signal voltage output from said representing means the average D.-C. signal portion thereof, means connected to said extracting means for converting the average D.-C. signal received therefrom to an alternating phase-sensitive signal, means connected to said converting means for amplifying the output signal therefrom, means connected to said amplifying means for detecting the directional and magnitude characteristics of the amplified error signal, means connected to said detecting means and responsive to the output signal therefrom for changing the speed of said severing means relative to the speed of said means for feeding said web thereby reducing the error signal voltage to zero, third means connected to said speed changing means for generating a signal proportional to the rate of speed change of said speed changing means, and means interconnecting said third generating means and said amplifying means for impressing the signal from said third generating means upon said amplifying means thereby biasing the error signal being amplified and automatically reducing to zero any error detected without overcorrection.

3. A device for exercising a control function over a cut-off mechanism, comprising rotatable severing means for severing a moving web, means for feeding said moving web to said severing means, first means for generating a signal proportional to the speed of said moving web, second means for generating a signal proportional to the rotational speed of said severing means, means for digitally selecting a standard sheet length to be severed, said standard sheet length being expressed in hundreds of units, tens of units, units and subdivisions of units, means connected to said digital selecting means for representing the electrical equivalent of the digitally expressed sheet length, means connecting said first and second generating means to said representing means for applying thereto signals generated thereby, an output error signal voltage from said representing means resulting whenever the length of sheet differs from the standard sheet length, means connected to said representing means for extracting from the error signal voltage output from said representing means the average D.-C. signal portion thereof, means connected to said extracting means for converting the average D.-C. signal received therefrom to an alternating phase-sensitive signal, means connected to said converting means for amplifying the voltage of the output signal therefrom, means connected to said voltage amplifying means for detecting the directional and magnitude characteristics of the voltage amplified error signal, means connected to said detecting means for amplifying the power of the output error signal therefrom, means connected to said power amplifying means and responsive to the power amplified error signal therefrom for changing the rotational speed of said severing means relative to the means for feeding said web thereby reducing the error signal to zero, third means connected to said speed changing means for generating a signal proportional to the rate of speed change of said speed changing means, and means interconnecting said third generating means and said voltage amplifying means for impressing the signal from said third generating means upon said voltage amplifying means to bias the error signal voltage being amplified whereby said speed changing means automatically reduces to zero any error detected without overcorrection.

4. A device for exercising a control function over a cutoff mechanism, comprising rotatable severing means for severing a moving web, means for feeding said web to said severing means, first means for generating a signal proportional to the speed of said moving web, second means for generating a signal proportional to the rotational speed of said severing means, means for digitally selecting a standard sheet length to be severed, said standard sheet length being expressed in hundreds of units, tens of units, units and subdivisions of units, means connected to the digital selecting means for representing the electrical equivalent of the digitally-expressed sheet length, means connecting said first and second generating means to said representing means for applying thereto signals generated thereby, an output error signal voltage from said representing means resulting whenever the length of sheet severed differs from the standard sheet length, means connected to said representing means for extracting from the error signal voltage output from said representing means the average D.-C. signal portion thereof, means connected to said extracting means for converting the average D.-C. signal received therefrom to an alternating phase-sensitive signal, means connected to said converting means for amplifying the voltage of the output error signal therefrom, means connected to said voltage amplifying means for detecting the directional and magnitude characteristics of the voltage amplified error signal, means connected to said detecting means for amplifying the power of the output error signal therefrom, a variable speed ratio mechanical transmission interconnecting said feeding means and said severing means, slow speed means connected to said transmission for slowly changing the ratio thereof, said slow speed means being responsive to the output signal from said power amplifying means, high speed means connected to said transmission for rapidly changing the ratio thereof, said high speed means being responsive to the output signal from said power amplifying means and means for simultaneously disconnecting said slow speed changing means and energizing said high speed changing means.

5. A device substantially as recited in claim 4 wherein the means for disconnecting the slow speed changing means and energizing the high speed changing means comprise a relay connected across the input to the extracting means, a switch mechanism actuated by said relay to disconnect a clutch between said slow speed changing means and to connect said high speed changing means to enable energization thereof.

References Cited by the Examiner
UNITED STATES PATENTS

| | | | |
|---|---|---|---|
| 2,250,209 | 7/41 | Shoults | 83—76 |
| 2,634,811 | 4/53 | Schaelchlin | 83—76 |
| 3,071,999 | 1/63 | Thorn | 83—76 |

FOREIGN PATENTS 488,854   12/52   Canada.

ANDREW R. JUHASZ, *Primary Examiner.*

HUNTER C. BOURNE, Jr., EDWARD ALLEN,
*Examiners.*